US009049505B2

(12) United States Patent
Wang

(10) Patent No.: US 9,049,505 B2
(45) Date of Patent: Jun. 2, 2015

(54) ELECTRONIC DEVICE WITH LOUDSPEAKER

(71) Applicant: Zhongshan Innocloud Intellectual Property Services Co., Ltd., Zhongshan (CN)

(72) Inventor: Man-Zhong Wang, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 327 days.

(21) Appl. No.: 13/658,822

(22) Filed: Oct. 24, 2012

(65) Prior Publication Data

US 2013/0322672 A1 Dec. 5, 2013

(30) Foreign Application Priority Data

May 31, 2012 (CN) .......................... 2012 1 0176824

(51) Int. Cl.
*H04R 1/02* (2006.01)
(52) U.S. Cl.
CPC ........................................ *H04R 1/02* (2013.01)
(58) Field of Classification Search
USPC ........................................................ 381/332
See application file for complete search history.

(56) References Cited

U.S. PATENT DOCUMENTS

| 5,710,821 | A  | * | 1/1998  | Cheah ............................. 381/332 |
| 2005/0233781 | A1 | * | 10/2005 | Erixon et al. ............... 455/575.1 |
| 2007/0280497 | A1 | * | 12/2007 | Isberg et al. ................... 381/345 |
| 2008/0069384 | A1 | * | 3/2008  | Kim et al. ....................... 381/189 |
| 2008/0130931 | A1 | * | 6/2008  | Hampton et al. .............. 381/335 |

* cited by examiner

*Primary Examiner* — Wayne Young
*Assistant Examiner* — Mark Fischer
(74) *Attorney, Agent, or Firm* — Novak Druce Connolly Bove + Quigg LLP

(57) ABSTRACT

An electronic device includes an upper cover, a bottom cover, and at least one loudspeaker. The upper cover includes a top wall and a first sidewall perpendicular to the top wall, and the first sidewall defines a number of first sound holes. The bottom cover includes at least one chamber opening toward the top wall. The chamber includes a second sidewall and a third sidewall opposite to the second sidewall. The second sidewall defines a number of second sound holes aligned with the respectively first sound holes. The loudspeaker is received in the chamber and includes a front portion facing the second sidewall and an opposite rear portion. The front portion and the second sidewall cooperatively form a front chamber in communication with the first and the second sound holes, and the rear portion and the third sidewall cooperatively form a back chamber.

6 Claims, 3 Drawing Sheets

ELECTRONIC DEVICE WITH LOUDSPEAKER

BACKGROUND

1. Technical Field

The present disclosure relates to electronic devices, and particularly, to an electronic device having a loudspeaker.

2. Description of Related Art

Many electronic devices, such as mobile phones and multimedia players, include a loudspeaker to provide audio output capabilities. When an electric current is supplied to a loudspeaker, the diaphragm of the loudspeaker is driven to oscillate, thereby pushing ambient air in the electronic device to generate sound. It is well known that a front chamber and a back chamber are respectively formed before and behind the loudspeaker, and the sound waves generated in the front chamber and the back chamber typically have a same amplitude and opposite phase. Thus, the sound wave with low frequency generated in the back chamber may easily pass over the loudspeaker and then interfere with the sound wave generated in the front chamber, so lowering the sound of low frequency and then adversely affecting the sound output quality of the loudspeaker. Therefore, the back chamber is usually designed to have an isolated structure to prevent the generated sound waves to interfere with each other.

In order to improve the sound output quality of low frequency, it is better that the back chamber is designed to have a considerable large size, however, the increase of the size of the back chamber may also result in the increase of the thickness of the electronic device.

Therefore, what is needed is a means to solve the problems described above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

Figure 1:
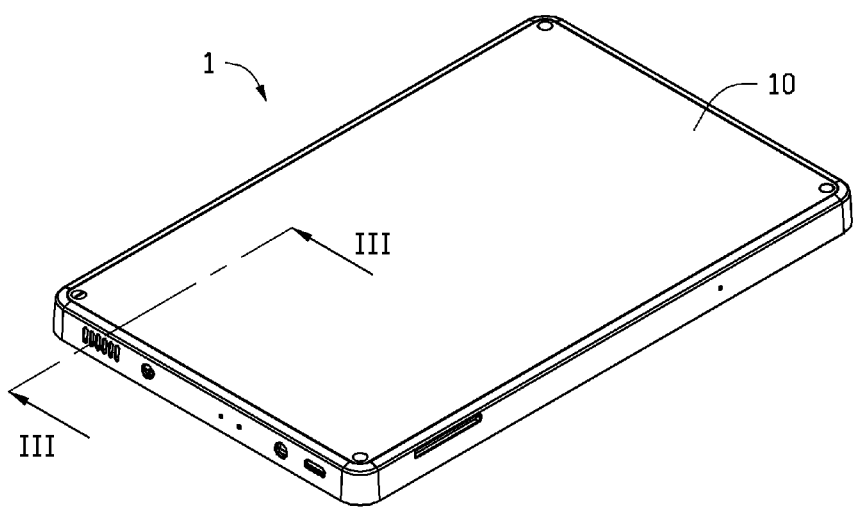
FIG. 1 is an isometric view of an electronic device in accordance with an exemplary embodiment.
Figure 2:
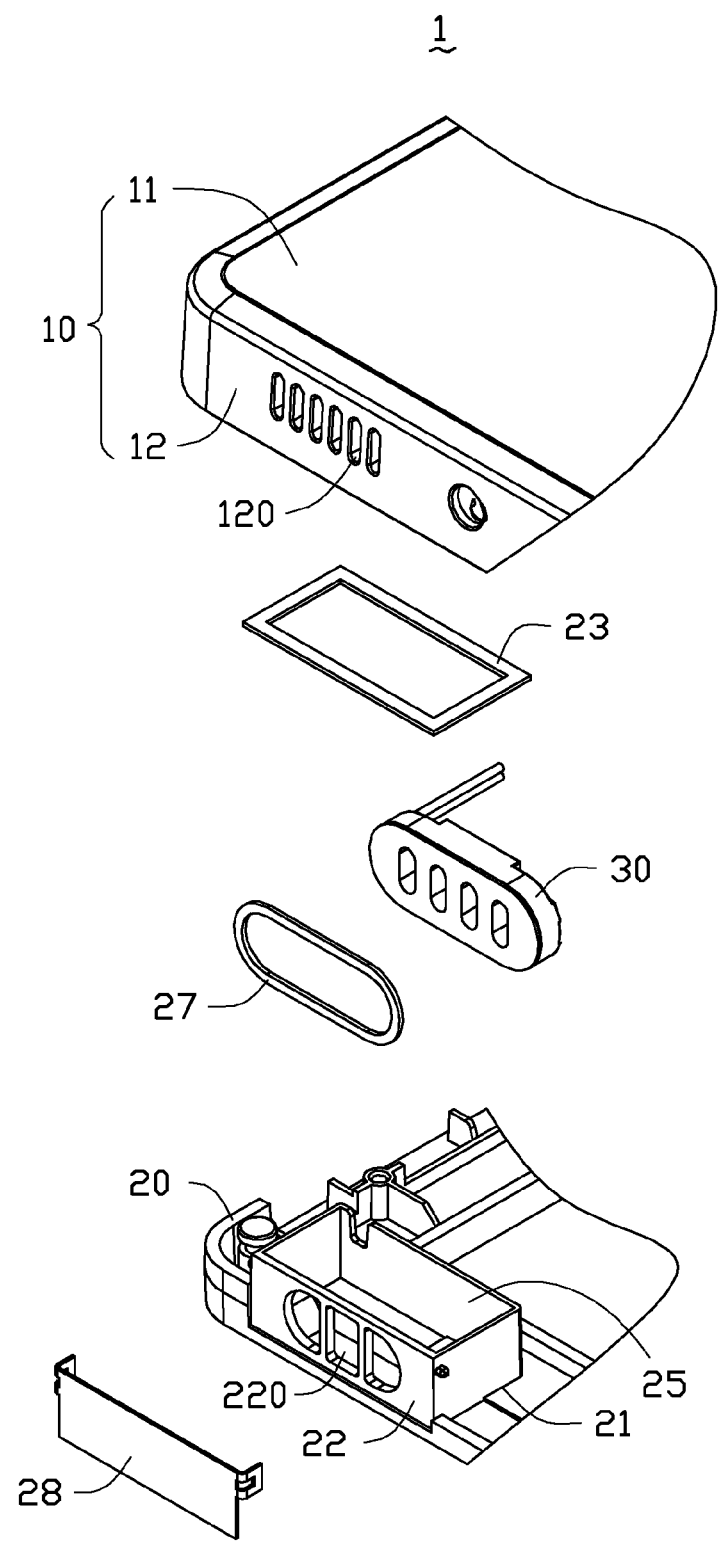
FIG. 2 is a disassembled isometric view of the electronic device of FIG. 1.
Figure 3:
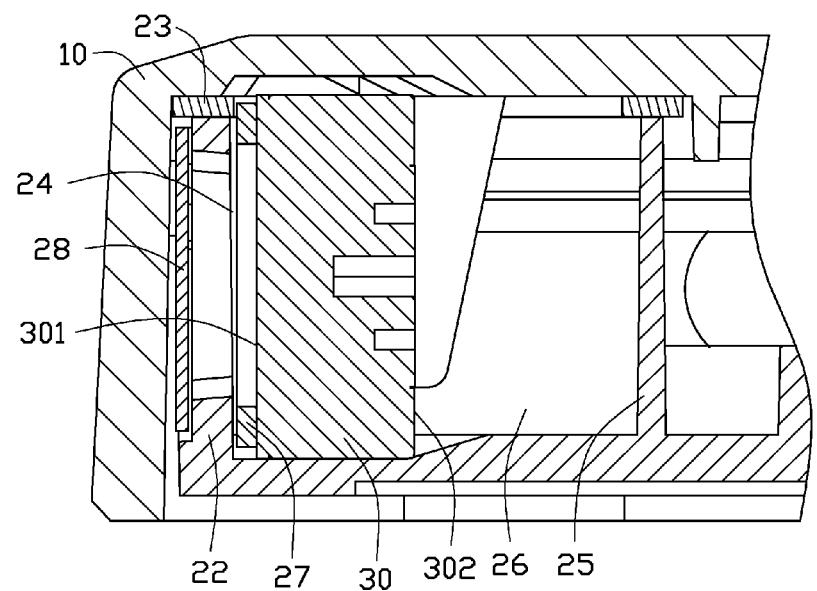
FIG. 3 is a partially cross-sectional view taken along line IV-IV of FIG. 1.

FIGS. 1-3 illustrate an electronic device 1 in accordance with an exemplary embodiment. The electronic device 1 includes an upper cover 10, a bottom cover 20 opposite to the upper cover 10, and at least one loudspeaker 30 arranged between the upper cover 10 and the bottom cover 20. In the embodiment, there is one loud speaker 30.

The upper cover 10 includes a top wall 11 and a first sidewall 12 perpendicular to the top wall 11. The first sidewall 12 defines a number of first sound holes 120. In the embodiment, a total area of the first sound holes 120 is about 30% of an area of the first sidewall 12.

The bottom cover 20 defines a chamber 21 opening toward the top wall 11 of the upper cover 10 for receiving the loudspeaker 30. The chamber 21 includes a second sidewall 22 that defines a number of second sound holes 220 respectively aligned with the respectively first sound holes 120. In the embodiment, a first sealing member 23, such as foam, is sandwiched between the inner surface of the top wall 11 and the top of the chamber 21 to fill the gap between inner surface of the top wall 11 and the chamber 21.

The loudspeaker 30 is mounted in the chamber 21, and a front portion 301 of the loudspeaker 30 faces the second sidewall 22. The front portion 301 is spaced by a distance from the second sidewall 22 to allow the front portion and the second sidewall 22 to cooperatively form a front chamber 24. The front chamber 24 is in communication with the first and the second sound holes 120, 220, thereby allowing the sound generated in the front chamber 24 by the loudspeaker 30 to spread out of the electronic device 1 through the second sound holes 220 and the first sound holes 120. Furthermore, because the front portion 301 of the loudspeaker 30 faces the second sound holes 220, loss of the generated sound in the transmission process can be reduced.

The chamber 21 further includes a third sidewall 25 opposite to the second sidewall 22, and the rear portion 302 of the loudspeaker 30 and the third sidewall 25 cooperatively form a back chamber 26. In the embodiment, the loudspeaker 30 further includes a second sealing member 27, and the second sealing member 27 isolates the front chamber 24 from the back chamber 26. With this configuration, it is notable that the size of the back chamber 26 can be increased by increasing the distance between the second and the third sidewalls 22, 25 without increasing the thickness of the electronic device 1.

In an alternative embodiment, the bottom cover 20 can be replaced by a printed circuit board, and the electronic element of the electronic device 1 that is connected to the loudspeaker 30 can be directly mounted on the printed circuit board.

In the embodiment, a spacer 28 is arranged between the first and the second sidewalls 12, 22, and the spacer 28 defines a number of third sound holes (not shown). The size of the third sound holes is less than that of any of the first and the second sound holes 120, 220, such that the spacer 28 can prevent dust particles from entering into the electronic device 1 through the first and the second sound holes 120, 220.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device comprising:
   an upper cover comprising a top wall and a first sidewall perpendicular to the top wall, the first sidewall defining a plurality of first sound holes;
   a bottom cover opposite to the upper cover and comprising at least one chamber opening toward the top wall, the chamber comprising a second sidewall and a third sidewall opposite to the second sidewall, and the second sidewall defining a plurality of second sound holes respectively aligned with the respective first sound holes; and
   at least one loudspeaker received in the at least one chamber and comprising a front portion facing the second sidewall and an opposite rear portion, the front portion and the second sidewall cooperatively forming a front chamber in communication with the first and the second sound holes, and the rear portion and the third sidewall cooperatively forming a back chamber.

2. The electronic device of claim 1, wherein the number of the at least one loudspeaker is one, and the number of the at least one chamber is one.

3. The electronic device of claim 1, wherein a total area of the first sound holes is about 30% of an area of the first sidewall.

4. The electronic device of claim 1, further comprising a first sealing member, wherein the first sealing member is sandwiched between the top wall and a top of the chamber to fill a gap between the top wall and the chamber.

5. The electronic device of claim 1, wherein the loudspeaker further comprises a second sealing member, and the second sealing member is configured to isolate the front chamber from the back chamber.

6. The electronic device of claim 1, further comprising a spacer, wherein the spacer is arranged between the first and the second sidewalls; the spacer defines a plurality of third sound holes, each third hole has a size less than that of any of the first and the second sound holes, thereby preventing dust particles from entering into the electronic device through the first and the second sound holes.

* * * * *